United States Patent
Nutto

[11] Patent Number: 5,810,230
[45] Date of Patent: *Sep. 22, 1998

[54] CONVERTIBLE BAGS

[76] Inventor: Uwe Nutto, Boelkestrasse 19, D-79100 Freiburg, Germany

[*] Notice: The term of this patent shall not extend beyond the expiration date of Pat. No. 5,667,117.

[21] Appl. No.: 753,551

[22] Filed: Nov. 12, 1996

Related U.S. Application Data

[63] Continuation-in-part of Ser. No. 454,336, Aug. 11, 1995, Pat. No. 5,667,117.

[30] Foreign Application Priority Data

Dec. 15, 1992 [DE] Germany ............ 42 42 211.6

[51] Int. Cl.⁶ .................... B62T 9/00; A45F 4/02
[52] U.S. Cl. ............ 224/417; 224/430; 224/584
[58] Field of Search ............ 224/153, 581–585, 224/412, 413, 416, 417, 425–431, 433, 441, 447–450; 190/102, 108, 109, 110

[56] References Cited

U.S. PATENT DOCUMENTS

| | | |
|---|---|---|
| 1,963,333 | 6/1934 | Morales ............ 224/429 |
| 3,786,972 | 1/1974 | Alley . |
| 3,937,374 | 2/1976 | Hine, Jr. . |
| 4,244,496 | 1/1981 | Litz . |
| 4,271,996 | 6/1981 | Montgomery . |
| 4,295,586 | 10/1981 | Shockley . |
| 4,402,439 | 9/1983 | Brown ............ 224/417 |
| 4,433,802 | 2/1984 | Woolf . |
| 4,442,960 | 4/1984 | Vetter ............ 224/417 |
| 4,450,988 | 5/1984 | Meisel ............ 224/417 |
| 4,487,344 | 12/1984 | Blackburn et al. . |
| 4,491,258 | 1/1985 | Jones . |
| 4,577,786 | 3/1986 | Dowrick et al. . |
| 4,580,706 | 4/1986 | Jackson et al. . |
| 5,667,117 | 9/1997 | Nutto ............ 224/585 |

FOREIGN PATENT DOCUMENTS

| | | |
|---|---|---|
| 63797 | 11/1942 | Denmark . |
| 1127921 | 12/1956 | France . |
| 1158664 | 6/1958 | France . |
| 3513878 | 4/1986 | Germany . |
| 3532332 | 3/1987 | Germany . |
| 3618611 | 12/1987 | Germany . |
| 124500 | 3/1949 | Sweden . |
| 2253136 | 9/1992 | United Kingdom . |

OTHER PUBLICATIONS

Velcro Product News; Nov. 1979, PN No. 51; Nov. 1978.

Primary Examiner—Allan N. Shoap
Assistant Examiner—Gregory Vidovich
Attorney, Agent, or Firm—Panitch Schwarze Jacobs & Nadel, P.C.

[57] ABSTRACT

Convertible bags may be fastened to supports on a bicycle in a first configuration and are fastened together to form a knapsack in a second configuration. The convertible bags comprise at least first and second bags, each having a rear wall with a reinforcement adapted to face the bicycle. Fittings are attached to the rear walls of the at least first and second bags. The fittings include a connector elements which releasably connect the bags to the bicycle in the first configuration. The fittings attached to the first bag are arranged in complementary positions to the fittings attached to the second bag, and at least one fitting on one of the first and second bags further includes a receiving element in which the connector element on the complementarily positioned fitting on the other of the first and second bags is engaged when the first and second bags are in the second configuration.

6 Claims, 3 Drawing Sheets

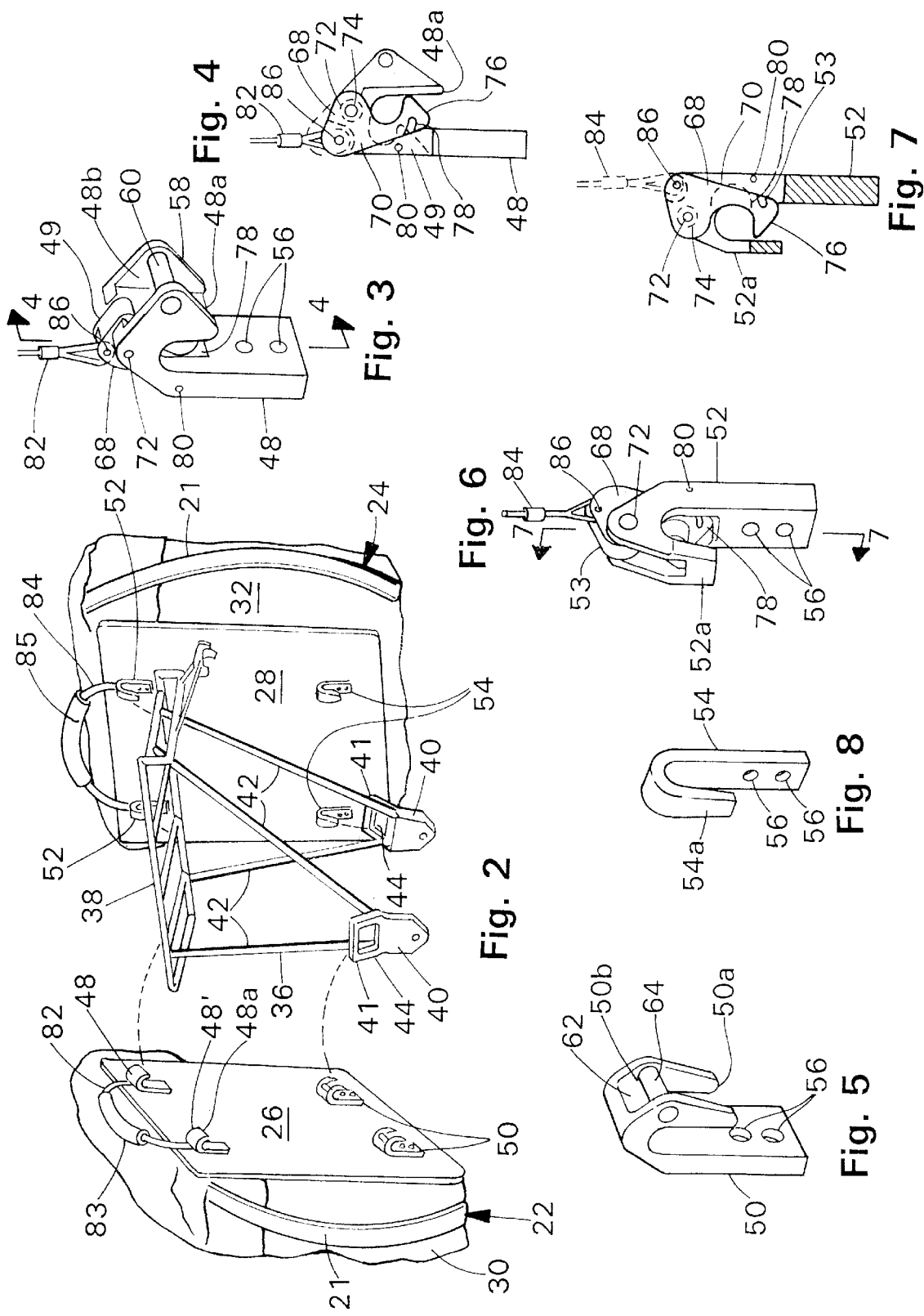

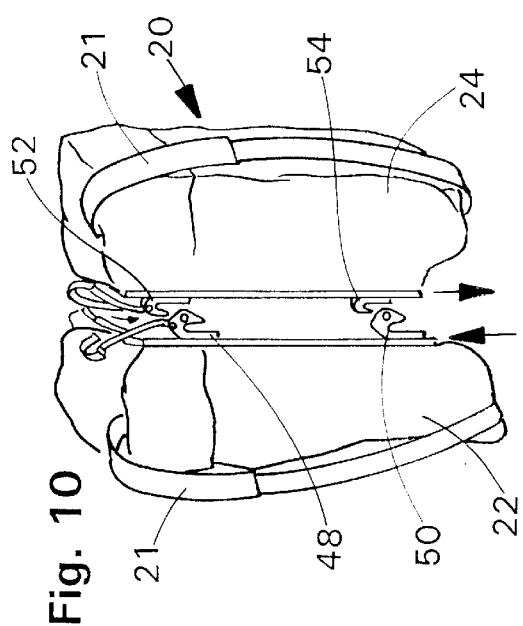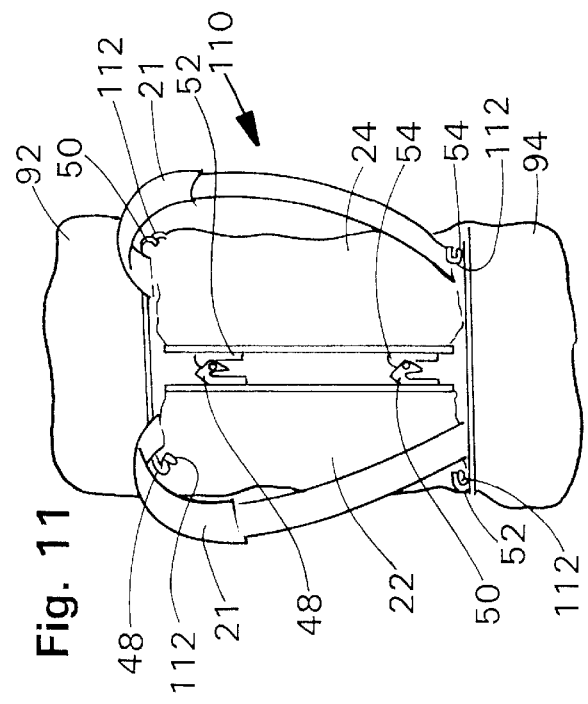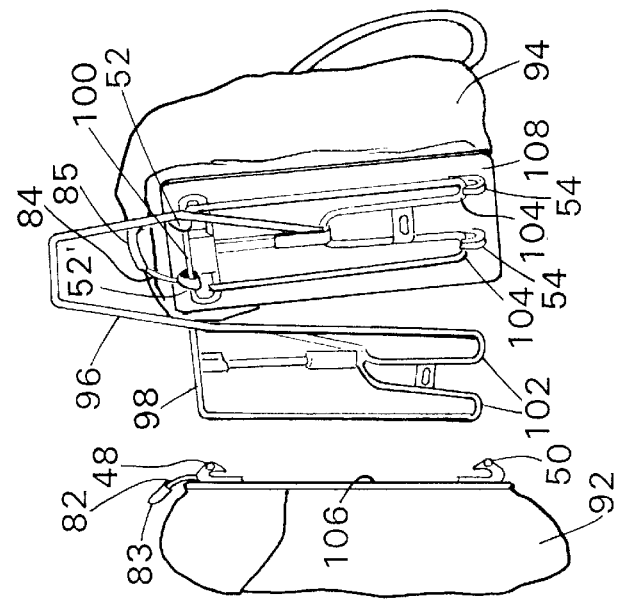

CONVERTIBLE BAGS

This application is a continuation-in-part of U.S. application Ser. No. 08/454,336, filed Aug. 11, 1995, now U.S. Pat. No. 5,667,117.

FIELD OF THE INVENTION

The present invention relates to bags with a fastening device for removably fastening them on a bicycle or for fastening them together to form a knapsack.

BACKGROUND OF THE INVENTION

U.S. Pat. No. 4,491,258 has disclosed bags having three storage elements capable of being stiffened by reinforcing strips in a knapsack mode. In the bicycle pannier mode, these reinforcing strips are to keep the bags from hitting the spokes unchecked when the bicycle is in motion.

When the known bags are used as bicycle panniers, they are placed over bicycle racks so that two of the three storage elements of a bag hang down next to the rear wheel and next to the front wheel. Two smaller front wheel bags are to be interconnected to form a unit by a divisible zip fastener, by snap fasteners and by elastic bungy cords before they are placed on the front rack. The bungy cords are then fastenable by hooks to the rack supports. The larger bag is intended for fastening to the rear rack and is fixed to the rack supports or bicycle frame with the aid of straps.

When the three bags are assembled to form a knapsack, they are first placed side by side with the larger rear wheel bag arranged between the then parted front wheel bags. The three bags are interconnected by connecting respective zip fasteners and snap fasteners. To stiffen the knapsack thus composed, the strips are slid into sleeves provided on the back of the rear wheel bag. To impart greater dimensional stability to the knapsack as a whole, the knapsack assembled from the bags is provided with a plurality of straps surrounding it lengthwise and crosswise.

Although transport of the bags on a bicycle with the aid of the known fastening devices is satisfactory on well-surfaced roads, this fastening mode is inadequate when riding on bad stretches of road and particularly cross-country. Through the shocks occurring, laden bags are liable to slip due to their inertia, often causing falls particularly when negotiating curves or when riding cross-country. When heavily loaded, the cords and straps are under such a strain that they often tear or the seams connecting the straps onto the bag are ripped open. Furthermore, the use of racks proves to be disadvantageous for transportation of the bicycle laden with bags, because the wheels often have to be taken off the bicycle due to space limitations. The racks remaining on the bicycle frame are nevertheless in the way and also susceptible to damage. It is troublesome to remove the racks from the bicycle, especially since in addition to carrying the bags a cyclist then also has to carry the detached racks.

U.S. Pat. No. 4,433,802 has disclosed a bicycle pannier—knapsack device having a rack which is detachable from the bicycle and is usable as a frame when two carried bags are combined to form a knapsack.

This device has the drawback, however, that the parts of the rack used as the knapsack frame have to be interconnected with the aid of several clevis pins. Even though this ensures that the rack members can to some degree be varied to accommodate the size of the person carrying the knapsack, change of mode is made complicated and tedious by the bothersome removal of the spring clip fasteners.

PCT Application PCT/DE93/01195, which was invented by the present inventor and from which this application claims priority, discloses bicycle bags which attached to a bicycle using fittings which include connecting elements located on the bags which can be attached to complementary fittings on the bicycle using quick attachment means having an eccentric clamping lever. The bags can also be connected together along with the rear carrier using the quick attachment means to form a knapsack.

While some of the known fastening devices are acceptable for providing bags which can be alternatively fastened to a bicycle or assembled together to form a knapsack, sporty cyclists who are known to be very exacting when it comes to the functionality of the items they use, desire bags which are both more easily and quickly fastened to the bicycle or converted and assembled to form a knapsack.

SUMMARY OF THE INVENTION

The object underlying the invention is therefore to provide fastening devices which ensure that, in addition to fastening bags on the bicycle sufficiently securely for cross-country rides, the bags can be mounted on or dismounted from the bicycle and can be quickly and simply combined to form a knapsack.

Briefly stated, the present invention provides convertible bags which can be fastened to supports on a bicycle in a first configuration and can be fastened together to form a knapsack in a second configuration. The convertible bags comprise at least first and second bags, each having a rear wall with a reinforcement adapted to face the bicycle. Fittings are attached to the rear walls of the at least first and second bags. The fittings include connector elements which releasably connect the bags to the bicycle in the first configuration. The fittings attached to the first bag are arranged in complementary positions to the fittings attached to the second bag, and at least one fitting on one of the first and second bags further includes a receiving element in which the connector element on the complementarily positioned fitting on the other of the first and second bags is engaged when the first and second bags are in the second configuration.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a perspective view, partially disassembled, of first and second bags in accordance with a preferred embodiment of the invention;

FIG. 3 is an enlarged perspective view of a first fitting located on at least one of the bags;

FIG. 4 is a cross-sectional view taken along lines 4—4 in FIG. 3;

FIG. 5 is an enlarged perspective view of a second fitting in accordance with another embodiment of the present invention;

FIG. 6, is a perspective view of a third fitting in accordance with the present invention;

FIG. 7 is a cross-sectional view taken along lines 7—7 in FIG. 6;

FIG. 8 is a enlarged perspective view of a fourth fitting in accordance with the invention;

FIG. 9 is a perspective view, partially disassembled, showing the third and fourth bags, in accordance with another embodiment of the invention;

FIG. 10 is a front elevational view showing the bags of FIG. 2 being assembled into a knapsack; and FIG. 11 is a front elevational view of an enlarged knapsack formed from the first, second, third and fourth bags of the present invention.

DETAILED DESCRIPTION OF PREFERRED EMBODIMENTS

Figure 1:
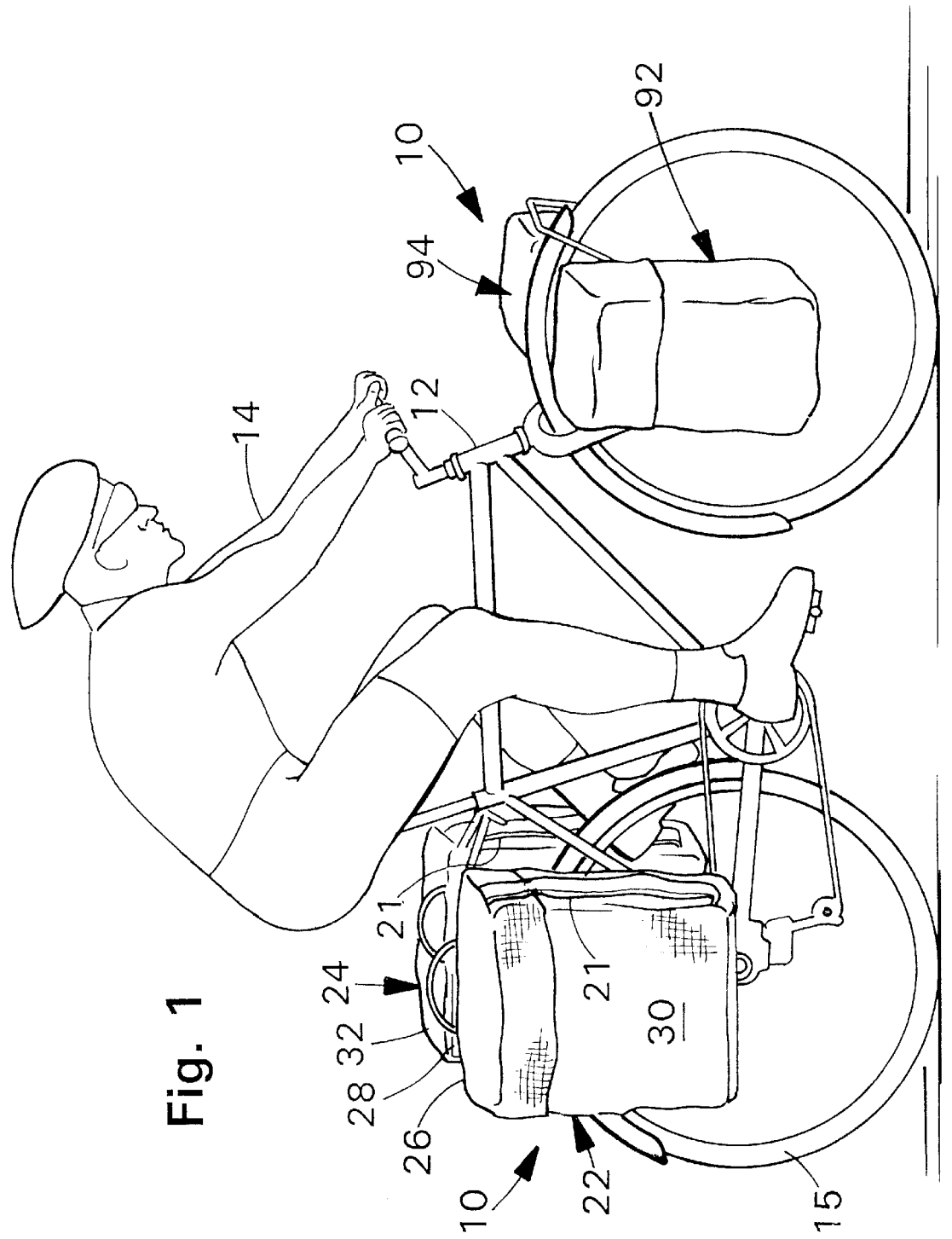
FIG. 1 is a semi-perspective side view of a bicycle ridden by a cyclist having bags with fastening devices in accordance with the present invention for attachment to the bicycle.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the convertible bags and designated parts thereof. The terminology includes the words above specifically mentioned, derivatives thereof and words of similar import.

Referring to the drawings, wherein like numerals indicate like elements throughout, there are shown in FIG. 1–11 convertible bags 10 in accordance with preferred embodiments of the present invention.

Referring now to FIG. 1, a bicycle 12 with a cyclist 14 is shown. Convertible bags 22, 24 are fastened to supports on the bicycle 12 in a first configuration, and are fastened together to form a knapsack 20, as shown in FIG. 10, in a second configuration. At least first and second bags 22, 24 are provided, with each bag 22, 24 having a rear wall 26, 28 adapted to face the bicycle 12. Preferably, the first and second bags 22, 24 also include a pouch portion 30, 32 made of a waterproof material which can be opened to store articles. The first and second bags 22, 24 are mounted on both sides of the rear wheel 15 of the bicycle 12 on a support frame 36, shown in detail in FIG. 2.

The pouches 30, 32 can be made of any suitable material, such as canvas or nylon, and the rear walls 26, 28 are preferably made of aluminum, wood, fiberglass or any other suitable lightweight rigid material.

The rear support 36 is preferably made of aluminum or composite tubing and includes an upper carrier portion 38 which is attached at its forward end to the bicycle frame, preferably to the bicycle seat frame attachment fastener as shown in FIG. 1 in a manner well known by those skilled in the art. The carrier 38 is supported by rods 42 which are connected to lower fittings 40 that attach to the bicycle frame at or above the rear wheel hub connection to the frame. The lower fittings 40 can be connected to the frame by mechanical fasteners in a manner well known by those skilled in the art, and may be quick-release fasteners, if desired. Preferably, each lower fitting 40 includes an outwardly projecting portion 41, which extends away from the bicycle wheel. An opening 44 is defined through the outwardly projecting portion 41. The lower fittings 40 are preferably machined from aluminum or an aluminum alloy. However, it will be recognized by those skilled in the art from the present application that the lower fittings can be made from any suitable metallic or polymeric material, if desired.

Referring now to FIG. 2, fittings 48, 50, 52 and 54 are attached to the rear walls 26, 28 of the at least first and second bags 22 and 24. As shown in detail in FIGS. 3–8, each fitting 48, 50, 52 and 54 includes a connector element 48a, 50a, 52a and 54a which releasably connects the bags 22, 24 to the bicycle 12 in the first configuration, as shown in FIGS. 1 and 2.

Preferably, each connector elements 48a, 50a, 52a and 54a comprise a hook-shaped member, as shown in detail in FIGS. 3–7. The hook-shaped members are adapted for attachment to the carrier 38 and the outwardly projecting portions 41 of the lower fittings 40 to attach the first and second convertible bags 22, 24 on either side of the rear wheel of the bicycle 12. Preferably, first and second fittings 48, 50 are attached to the first bag 22 and are arranged in complementary positions to the third and fourth fittings 52, 54 attached to the second bag 24. As shown in FIG. 2, preferably two of the first fittings 48 are attached to the upper portion of the rear wall 26 of the first bag 22 and two of the second fittings 50 are attached to a lower portion of the rear wall 26 of the first bag. Similarly, two of the third fittings 52 are attached to an upper portion of the rear wall 28 of the second bag 24, and two of the fourth fittings 54 are attached to a lower portion of the rear wall 28 of the second bag 24. However, it will be recognized by those skilled in the art from the present disclosure that more or fewer fittings could be used on the bags 22, 24 of the present invention to secure the bags 22, 24 to the bicycle 12 in the first configuration.

Referring now to FIGS. 2, 3 and 5, at least one fitting 48, 50 on one of the first and second bags 22, 24, and most preferably on the first bag 22 as shown, further includes a receiving element 48b, 50b in which the connector element 52a, 54a on the complementarily positioned fitting 52, 54 on the other of the first and second bags 22, 24, and most preferably on the second bags 24, is engaged when the first and second bags 22, 24 are in the second configuration, as shown in detail in FIG. 10.

Referring now to FIG. 3, on the first fitting 48, the receiving element 48b is comprised of a channel 58 located on the portion of the connector element 48a facing away from the rear wall 26 of the first bag 22. Preferably a first pin 60 extends across the channel 58. The first pin 60 is engaged by the connector element 52a of the complementarily located fitting 52 on the rear wall 28 of the second bag 24.

As shown in FIG. 5, the second fitting 50 similarly includes a channel 62 and a second pin 64 which extends across the channel 62. The second pin 64 is engaged by the connector element 54a of the fourth fitting 54 when the first and second bags 22, 24 are in the second configuration.

Referring now to FIGS. 3, 4, 6 and 7, at least one fitting 48, 52 on each of the first and second bags 22, 24 further includes a retaining element 68 which cooperates with the connector element 48a, 52a to releasably retain the first and second bags 22, 24 to the bicycle 12 in the first configuration, as shown in FIGS. 1 and 2, and to releasably retain the first and second bags 22, 24 to each other in the second configuration, as shown in FIG. 10.

Referring to FIGS. 4 and 7, preferably the retaining element 68 is a hook-shaped pawl 70 which is located in a slot 49, 53 in the first and third fittings 48, 52, respectively. The hook-shaped pawl 70 is pivotally mounted on a pin 72. Preferably, a coil spring 74 is located around the pin 72 to bias the pawl 70 to a first, closed position, as shown in FIGS. 4 and 7. The pawl 70 includes a tapered portion 76 which contacts the carrier frame 38 when the bags 22, 24 are being attached to the bicycle 12 in the first configuration, and which contacts the pins 60, 64 when the first and second bags 22, 24 are being connected together in the second configuration, which forces the pawl 70 to a second, open position, as shown in phantom lines in FIGS. 4 and 7. The spring 74 returns the pawl 70 to the first, closed position once the carrier frame 38 or pin 60, 64 is seated within the hook-shaped portion of the connector element 48a, 52a. Preferably, each pawl 70 includes a slot 78 which is engaged by a limit stop pin 80 which extends into the slot 49 in the first fitting 48 and the slot 53 in the third fitting 52. The limit stop pin 80 limits the travel of the pawl 70 as it moves from the first, closed position, to the second, open position.

In the preferred embodiment, the fittings 48, 50, 52 and 54 include mounting apertures 56 for mounting the fitting to the rear walls 26, 28 of the respective first and second bags 22, 24. The fittings 48, 50, 52 and 54 can be mounted on the rear walls 26, 28 with mechanical fasteners, such as screws, bolts or rivets, or any other suitable fastening means. Preferably, the fittings 48, 50, 52 and 54 are machined from a light weight aluminum or titanium alloy. However, it will be recognized by those skilled in the art from the present disclosure that the fittings 48, 50, 52 and 54 can be made from other suitable materials, such as steel, composite or polymeric materials, if desired. The pawls 70 are also machined from a light weight aluminum or titanium alloy, and may also be made from other suitable metallic or polymeric materials, if desired. Preferably, the pins 60, 64, 72 and 80 are made of steel or other suitable metallic, composite or polymeric materials.

Referring again to FIGS. 2, 3 and 7, preferably the first bag includes two of the first fittings 48 having the retaining elements 68 mounted on the upper portion of the rear wall 26, and the second bag includes two of the third fittings 52 having the retaining elements 68 mounted on the upper portion of the rear wall 28. Preferably, the retaining elements 68 on the first fittings 48 on the first bag 22 are connected together by a strap 82 and the retaining elements 68 on the third fittings 52 on the second bag 24 are similarly connected together by a strap 84. Each end of the respective straps 82, 84 is connected to a respective retaining element 68 by a pin 86. Preferably, each strap 82, 84 also includes a grip portion 83, 85 made of a rubber or polymeric material which can be easily grasped and carried by a user. Pulling on the strap 82, 84 releases the retaining elements 68 on a respective bag 22, 24 by pivoting the pawl 70 of each retaining element 68 to the second, open position and provides a convenient means for a user to disconnect the bags 22, 24 from the bicycle in a single lifting movement.

The first and second bags 22, 24 can then be connected together in the second configuration to form a knapsack 20, as shown in FIG. 10, by engaging the connector elements 52a, 54a on the third and fourth fittings 52, 54 located on the rear wall 28 of the second bag 24 with the receiving elements 48b, 50b on the first and second fittings 48, 50 on the rear wall 26 of the first bag 22. The knapsack 20 can be conveniently carried by the shoulder straps 21.

While the first preferred embodiment of the knapsack 20 has been described with the first, second, third and fourth fittings 48, 50, 52 and 54, it will be recognized by those skilled in the art from the present disclosure that the first bag could include only one or more of the first fittings 48, and the second bag 24 could include one or more third fittings 52 located in complementary positions to the first fittings 48 on the first bag 22, such that retaining elements 68 are provided on each fitting, if desired. Release cords (not shown) would then be required for all of the fittings to release the retaining elements.

Referring again to FIGS. 1 and 9, preferably third and fourth bags 92 and 94 are fastened to the bicycle 12 in a third configuration. Preferably, the third and fourth bags 92 and 94 are fastened to a forward carrier frame 96 which is connected to the front wheel fork of the bicycle 12. Preferably, the forward carrier frame 96 is made of aluminum or titanium tubing and includes horizontal upper rails 98, 100 located on opposite sides of the front wheel of the bicycle 12 and lower looped portions 102, 104. The forward carrier frame 96 is preferably attached to the bicycle 12 using fasteners, such as nuts and bolts, or may be removable with clamps or quick disconnect devices to the bicycle 12. These types of connections are generally known to those skilled in the art, and accordingly, further description is not believed to be necessary or limiting.

Referring again to FIG. 9, the third and fourth bags 92, 94 include rear walls 106, 108 with a reinforcement adapted to face the bicycle 12. The third and fourth bags 92, 94 can be fastened together to form a second knapsack in a fourth configuration, and can be connected to the first and second bags 22, 24 in a fifth configuration to form an enlarged knapsack 110, as shown in FIG. 11.

As shown in FIG. 9, preferably the third bag 92 includes fittings 48, 50 having the connector elements 48a, 50a, and the fourth bag 94 includes the fittings 52, 54 having the connector elements 52a and 54a. Preferably, the first and second fittings 48, 50 are attached to the rear wall 106 of the third bag 92, and the third and fourth fittings 52, 54 are attached to the rear wall of the fourth bag 94 in a similar manner to the first and second bags 22, 24. One notable difference is that the second fittings 50, which are attached to the lower portion of the rear wall 106 of the third bag 92 are mounted in an inverted position in comparison to the installation of the second fittings 50 on the first bag 22. The fourth fittings 54 are similarly attached to the rear wall 108 of the fourth bag 94 in an inverted position in comparison to the second bag 24. The fittings 48, 50, 52 and 54 are otherwise as previously described.

In order to mount the third and fourth bags 92, 94 to the forward carrier frame 96, the second and fourth fittings must be first hooked under the looped portions 102, 104 of the forward carrier frame 96, and the first and second bags 92, 94 moved upward until the hooked connector element 48a, 52a of the first and third fittings 48, 52, pass over the respective upper horizontal rails 98, 100. The third and fourth bags 92, 94 are then moved downwardly such that the connector elements 48a, 52a engage the respective upper horizontal rails 98, 100, and the pawls 70 in the fittings 48, 52 are moved by contact with the upper horizontal rails 98, 100 to the second, open position, prior to returning to their first, closed position to secure the third and fourth bags 92, 94 in position. Although the second and fourth fittings 50, 54 which are mounted on the lower portion of the rear walls 106, 108 of the third and fourth bags 92, 94 move downwardly during this process, the hook-shaped portions of the connector elements 50a, 54a are long enough that the looped portions 102, 104 of the forward carrier frame 96 remain engaged with the respective connector elements 50a, 54a.

The third and fourth bags 92, 94 are removed from the forward carrier frame 96 by pulling upwardly on the respective straps 82, 84 to disengage the retaining elements 68 in the first and third fittings 48, 52 from the upper horizontal rails 98, 100. The third and fourth bags 92, 94 are then lowered such that the second and fourth fittings 50, 54 disengage the looped portions 102, 104 on the lower portion of the forward carrier frame 96.

The third and fourth bags 92, 94 can be connected together in a fourth configuration in a similar fashion to the first and second bags 22, 24 to form a second knapsack (not shown) or may be connected with the first and second bags 22, 24 in a fifth configuration to form an enlarged knapsack 110, as shown in FIG. 11. The third and fourth bags 92, 94 are connected to the first and second bags 22, 24, which have been preassembled as knapsack 20, by straps or loops 112 made of a suitable polymeric or metallic material attached to the first and second bags 22, 24 located in complementary positions to the fittings 48, 50, 52 and 54 on the third and fourth bags 92 and 94, being engaged by at least one fitting 48, 50, 52 and 54 on each of the third and fourth bags 92, 94. Preferably, each fitting 48, 50, 52, 54 on the third and fourth bags 52, 54 is connected to a complementarily located loop on the first and second bags 22, 24, with the retaining elements 68 on the first and third fittings 48, 52 engaging the loops. The enlarged knapsack 110 can be conveniently carried with the shoulder straps 21.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. Convertible bags which can be fastened to supports on a bicycle in a first configuration and can be fastened together to form a knapsack in a second configuration, comprising:

at least first and second bags, each having a rear wall with a reinforcement adapted to face the bicycle;

fittings attached to the rear walls of the at least first and second bags, each fitting including a connector element which is adapted to releasably connect the bags to the supports on the bicycle in the first configuration, the fittings attached to the first bag being arranged in complementary positions to the fittings attached to the second bag, at least one fitting on one of the first and second bags further including a receiving element in which the connector element on the complementarily positioned fitting on the other of the first and second bags is engaged when the first and second bags are in the second configuration.

2. The convertible bags of claim 1 wherein at least one fitting on each of the first and second bags further includes a retaining element which cooperates with the connector element to releasably retain the first and second bags to the bicycle in the first configuration, and to releasably retain the first and second bags to each other in the second configuration.

3. The convertible bags of claim 2 wherein the first and second bags each include two fittings having the retaining element which are connected together by a strap, such that pulling on the strap releases both retaining elements.

4. The convertible bags of claim 2 wherein the connector elements are hook-shaped members, and the retaining elements are spring-biased pawls.

5. The convertible bags of claim 1 further comprising third and fourth bags which can be fastened to the bicycle in a third configuration, and which can be fastened together to form a second knapsack in a fourth configuration, and which can be connected to the first and second bags to form an enlarged knapsack in a fifth configuration, the third and fourth bags each having a rear wall with a reinforcement adapted to face the bicycle, fittings which include a connector element being attached to the rear walls of the third and fourth bags, the connector elements being adapted to releasably connect the third and fourth bags to the bicycle in the third configuration, the fittings attached to the third bag being arranged in complementary positions to the fittings attached to the fourth bag, at least one fitting on one of the third and fourth bags further including a receiving element in which the connector element on the complementarily positioned fitting on the other of the third and fourth bags is engaged when the third and fourth bags are in the fourth configuration.

6. The convertible bags of claim 1 wherein each connector element comprises a hook-shaped member and each receiving element comprises a pin which extends across a channel.

\* \* \* \* \*